United States Patent
Zhang et al.

(10) Patent No.: US 9,714,630 B2
(45) Date of Patent: Jul. 25, 2017

(54) NOISE BAFFLE FOR A ROTARY MACHINE AND METHOD OF MAKING SAME

(71) Applicant: General Electric Company, Schenectady, NY (US)

(72) Inventors: Hua Zhang, Greer, SC (US); Bradly Aaron Kippel, Greenville, SC (US); Valery Ivanovich Ponyavin, Greenville, SC (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 14/877,642

(22) Filed: Oct. 7, 2015

(65) Prior Publication Data

US 2017/0101970 A1 Apr. 13, 2017

(51) Int. Cl.
| | |
|---|---|
| *F01N 1/24* | (2006.01) |
| *F02M 35/12* | (2006.01) |
| *F02C 7/045* | (2006.01) |
| *G10K 11/16* | (2006.01) |
| *F01N 1/00* | (2006.01) |
| *F02M 35/00* | (2006.01) |

(52) U.S. Cl.
CPC .......... *F02M 35/1272* (2013.01); *F02C 7/045* (2013.01); *F02M 35/1283* (2013.01); *G10K 11/161* (2013.01); *F05D 2240/35* (2013.01); *F05D 2250/191* (2013.01); *F05D 2260/607* (2013.01); *F05D 2260/96* (2013.01); *F05D 2300/612* (2013.01)

(58) Field of Classification Search
CPC ............ F02M 35/1272; F02M 35/1283; F05D 2240/35

USPC ....... 181/214, 217, 218, 203, 222, 224, 225, 181/295, 294
See application file for complete search history.

(56) References Cited

U.S. PATENT DOCUMENTS

| | | | | | |
|---|---|---|---|---|---|
| 2,334,502 | A | * | 11/1943 | Parkinson | G10K 11/161 181/203 |
| 2,502,020 | A | * | 3/1950 | Olson | G10K 11/16 181/295 |

(Continued)

FOREIGN PATENT DOCUMENTS

| | | |
|---|---|---|
| AU | 199889669 B2 | 9/1999 |
| AU | 747141 | 5/2002 |

(Continued)

OTHER PUBLICATIONS

EPO Extended Search Report for related application 16191595.4 received Feb. 6, 2017, 7 pp.

(Continued)

*Primary Examiner* — Edgardo San Martin
(74) *Attorney, Agent, or Firm* — Armstrong Teasdale LLP

(57) ABSTRACT

A baffle for an air intake section of a rotary machine includes a pair of oppositely disposed perforated walls that at least partially define an exterior of the baffle and an interior cavity of the baffle. The baffle also includes a pair of panels disposed within the interior cavity. Each of the panels is coupled proximate a respective one of the perforated walls, such that a chamber is defined between the panels. Each of the panels includes a first sound absorbing material that is substantially completely vaporizable at an operating temperature of the rotary machine.

20 Claims, 6 Drawing Sheets

(56) References Cited

U.S. PATENT DOCUMENTS

| | | | | | |
|---|---|---|---|---|---|
| 2,519,160 | A | * | 8/1950 | Tucker | G10K 11/161 181/203 |
| 2,916,101 | A | * | 12/1959 | Naman | F16L 55/02754 181/224 |
| 3,126,978 | A | * | 3/1964 | Bergstrom | E04B 1/74 181/290 |
| 3,249,659 | A | * | 5/1966 | Voelker | B29C 44/32 156/179 |
| 3,312,304 | A | * | 4/1967 | Philipp | E04B 1/8409 181/290 |
| 4,057,123 | A | * | 11/1977 | Erickson | E04B 1/8227 160/351 |
| 4,167,986 | A | * | 9/1979 | Conway | F24F 13/24 181/224 |
| 4,266,602 | A | * | 5/1981 | White | F28D 7/0058 165/124 |
| 4,283,457 | A | * | 8/1981 | Kolsky | B32B 5/06 156/148 |
| 5,696,361 | A | * | 12/1997 | Chen | E04F 17/04 181/224 |
| 5,780,785 | A | * | 7/1998 | Eckel | E04B 1/84 181/285 |
| 5,817,990 | A | * | 10/1998 | Furse | F24F 13/24 181/224 |
| 5,856,640 | A | * | 1/1999 | Lynn | B64F 1/26 181/218 |
| 6,260,658 | B1 | | 7/2001 | Darrell et al. | |
| 6,851,514 | B2 | * | 2/2005 | Han | F01D 25/30 181/224 |
| 6,920,959 | B2 | * | 7/2005 | Han | F04D 29/542 181/222 |
| 7,028,416 | B1 | * | 4/2006 | Dobie | B60S 3/002 34/666 |
| 7,782,612 | B2 | * | 8/2010 | Walsh | H05K 5/0213 165/104.33 |
| 8,579,074 | B2 | * | 11/2013 | Kosaka | F02C 7/045 181/214 |
| 9,260,859 | B2 | * | 2/2016 | Matan | E04B 1/84 |
| 2002/0182061 | A1 | * | 12/2002 | Han | F01D 25/30 415/119 |
| 2006/0272886 | A1 | * | 12/2006 | Mueller | F02C 7/045 181/224 |
| 2008/0202848 | A1 | | 8/2008 | Mueller et al. | |
| 2009/0107059 | A1 | * | 4/2009 | Kipp | C04B 28/26 52/144 |

FOREIGN PATENT DOCUMENTS

| | | | | |
|---|---|---|---|---|
| DE | 3508790 A1 | * | 9/1985 | F01N 1/24 |
| EP | 0912358 A3 | | 6/1999 | |
| EP | 3921358 A3 | | 9/1999 | |
| FR | 2953635 A1 | | 6/2010 | |
| FR | 2953635 A1 | | 6/2011 | |
| GB | 311999 | | 12/1962 | |
| GB | 911999 A | | 12/1962 | |
| GB | 2426555 A | | 11/2006 | |
| JP | 52046508 A | * | 4/1977 | |
| JP | 01211608 A | * | 8/1989 | |

OTHER PUBLICATIONS

EP Search Report, dated Sep. 2, 2017, Application No./Patent No. 16191595.4-1607, General Electric Company.

* cited by examiner

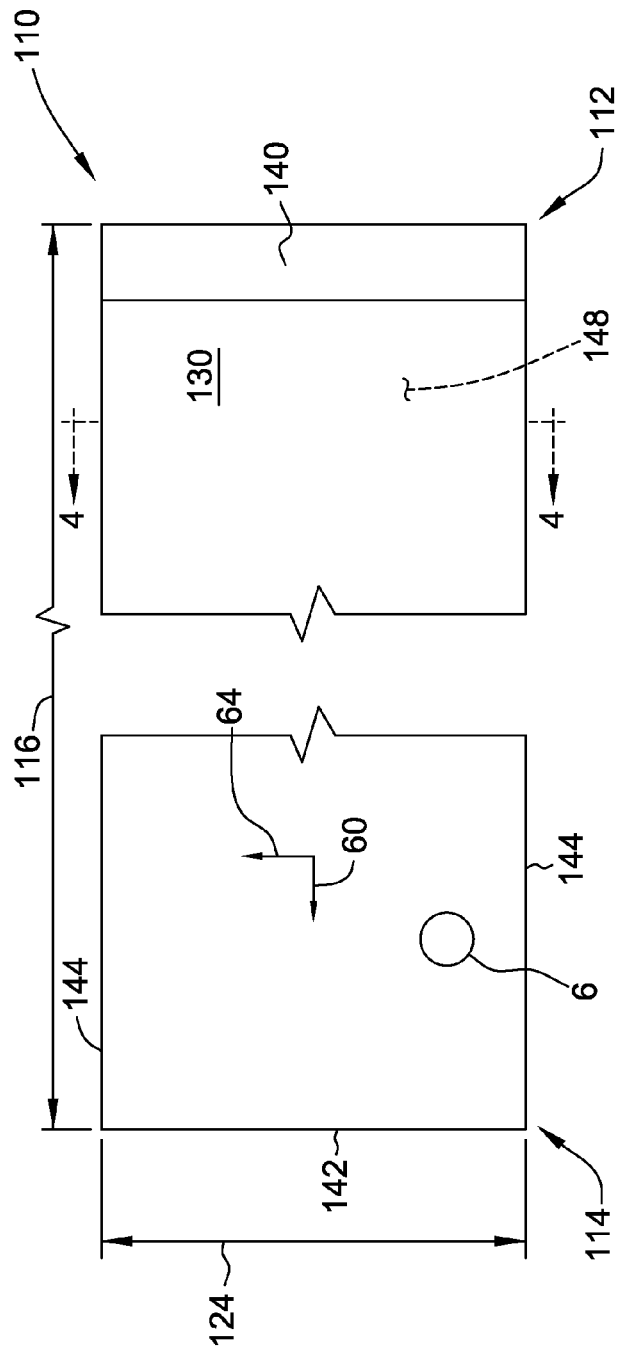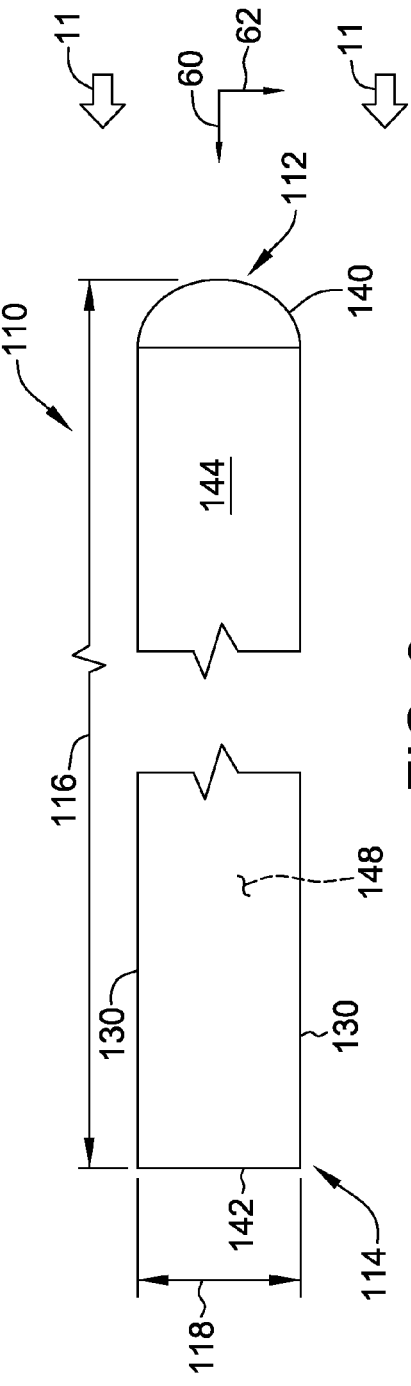

NOISE BAFFLE FOR A ROTARY MACHINE AND METHOD OF MAKING SAME

BACKGROUND

The field of the disclosure relates generally to noise reduction for rotary machines, and more particularly to a noise baffle for an intake section of a rotary machine.

At least some known rotary machines include silencers in an air intake section to reduce an amount of noise generated by the rotary machine. At least some known silencers include baffles that contain an effective sound absorbing material. However, at least some of the more effective sound absorbing materials do not completely vaporize at an operating temperature of the rotary machine. Thus, at least some such sound absorbing materials present a risk of forming deposits containing calcia, magnesia, alumina and silica (CMAS deposits) in a hot gas path of the rotary machine if such sound absorbing materials escape from the baffle. CMAS deposits may degrade performance of the rotary machine through, for example, spallation of thermal barrier coatings, plugging of cooling circuit holes, accumulation on areas that are impingement cooled, and other effects.

In addition, at least some known baffles include the effective sound absorbing material wrapped in a fiberglass cloth to inhibit escape of the sound absorbing material into the hot gas path. However, in at least some cases, the fiberglass cloth is not one hundred percent effective in preventing escape of the sound absorbing material from the baffle.

BRIEF DESCRIPTION

In one aspect, a baffle for an air intake section of a rotary machine is provided. The baffle includes a pair of oppositely disposed perforated walls that at least partially define an exterior of the baffle and an interior cavity of the baffle. The baffle also includes a pair of panels disposed within the interior cavity. Each of the panels is coupled proximate a respective one of the perforated walls, such that a chamber is defined between the panels. Each of the panels includes a first sound absorbing material that is substantially completely vaporizable at an operating temperature of the rotary machine.

In another aspect, a rotary machine is provided. The rotary machine includes an air intake section that includes a duct. The rotary machine also includes a combustor section coupled in flow communication with, and downstream from, the air intake section. The rotary machine further includes a silencer that includes a plurality of baffles coupled together in a spaced arrangement within the duct. At least one of the baffles includes a pair of oppositely disposed perforated walls that at least partially define an exterior of the baffle and an interior cavity of the baffle. The at least one baffle also includes a pair of panels disposed within the interior cavity. Each of the panels is coupled proximate a respective one of the perforated walls, such that a chamber is defined between the panels. Each of the panels includes a first sound absorbing material that is substantially completely vaporizable at an operating temperature of the combustor section.

In another aspect, a method of making a baffle for an air intake section of a rotary machine is provided. The method includes positioning a pair of perforated walls opposite each other to at least partially define an exterior of the baffle and an interior cavity of the baffle. The method also includes disposing a pair of panels within the interior cavity. Each of the panels is coupled proximate a respective one of the perforated walls, such that a chamber is defined between the panels. Each of the panels includes a first sound absorbing material that is substantially completely vaporizable at an operating temperature of the rotary machine.

BRIEF DESCRIPTION OF THE DRAWINGS

FIG. 2 is a schematic side view of an exemplary baffle for use with a rotary machine, such as the exemplary rotary machine shown in FIG. 1;

FIG. 3 is a schematic top view of the exemplary baffle shown in FIG. 2;

DETAILED DESCRIPTION

The exemplary noise baffles and methods described herein overcome at least some of the disadvantages associated with known noise baffles for rotary machines. The embodiments described herein provide a first sound absorbing material that is substantially completely vaporizable at an operating temperature of the rotary machine. The first sound absorbing material is positioned proximate each of at least two exterior perforated walls of the baffle, such that an interior chamber is defined therebetween. In some embodiments, the interior chamber provides a further damping chamber. Alternatively, a second sound absorbing material, having improved acoustical damping capability but also increased risk of CMAS deposits, is positioned within the chamber. Because the first sound absorbing material is interposed between the second sound absorbing material and the exterior perforations, a risk of the second sound absorbing material escaping the baffle is reduced or eliminated. In certain embodiments, the first sound absorbing material is reticulated.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
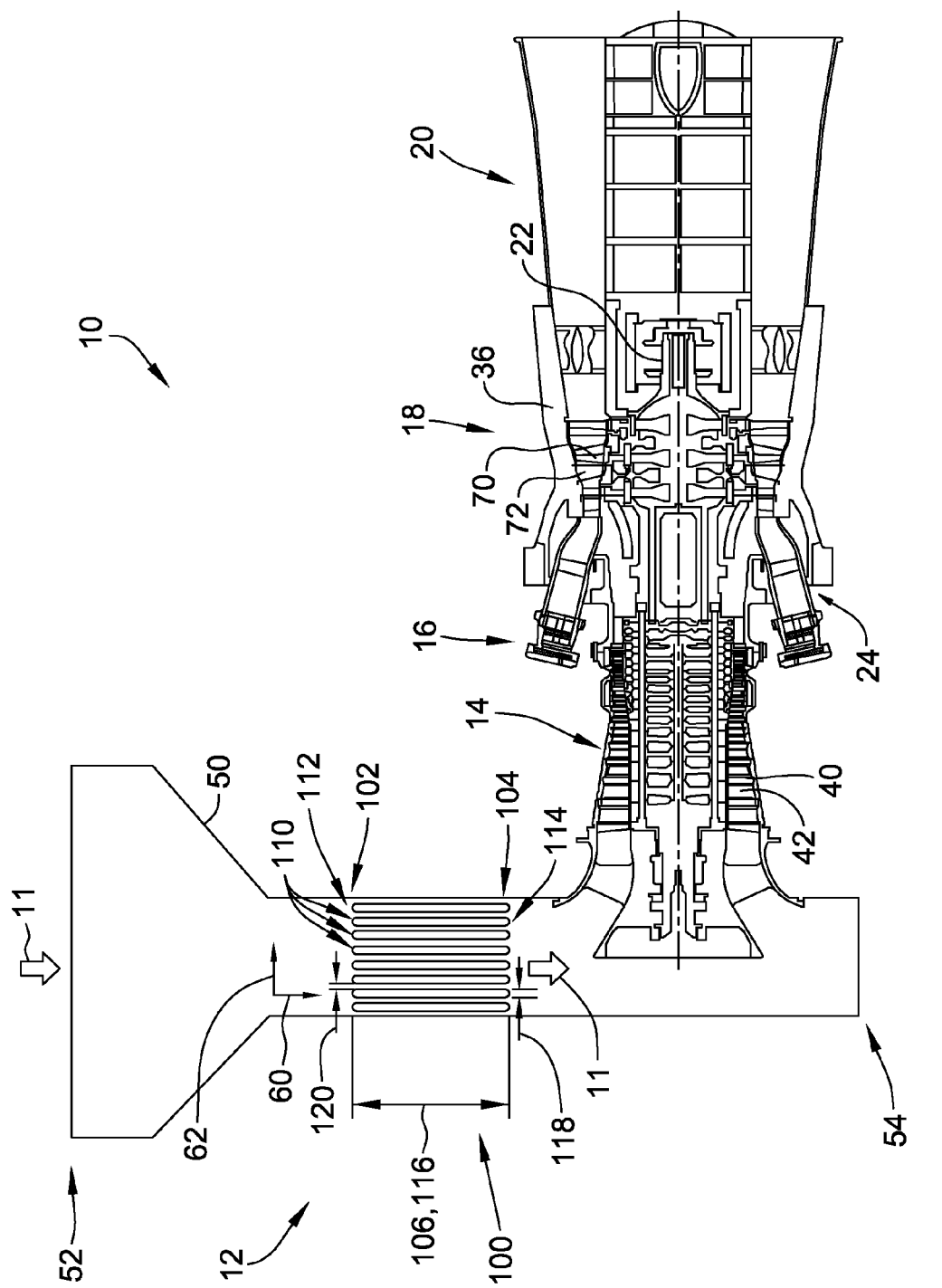
FIG. 1 is a schematic section view of an exemplary rotary machine.

FIG. 1 is a schematic section view of an exemplary rotary machine 10 with which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any machine having an intake section for which the embodiments of the current disclosure are enabled to function as described herein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air 11 towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10, such as, but not limited to, rotor blades 70 and other components in a hot gas path of rotary machine 10, are subject to wear and/or damage from CMAS deposits.

In the exemplary embodiment, intake section 12 includes a duct 50 that extends from a first end 52 to a second end 54. Air 11 enters duct 50 at first end 52, and exits duct 50 into compressor section 14 proximate second end 54. Duct 50 has any suitable geometry that enables rotary machine 10 to function as described herein.

A silencer 100 is disposed within, and in flow communication with, duct 50. Silencer 100 is configured to reduce a sound generated by rotary machine 10 by a selected amount over a selected range of frequencies. Silencer 100 extends from a first end 102 to a second end 104 in a longitudinal direction 60 defined generally parallel to a direction of a flow of air 11 in duct 50. Air 11 enters silencer 100 at first end 52, and exits silencer 100 at second end 104. A length 106 of silencer 100 is defined between first end 102 and second end 104. Silencer 100 is positioned at any suitable location in duct 50 that enables rotary machine 10 to function as described herein.

Silencer 100 includes a plurality of baffles 110. Each baffle is secured within silencer 100 in any suitable fashion. For example, but not by way of limitation, plurality of baffles 110 is coupled together in a spaced arrangement by a suitable frame (not shown), and the frame is coupled to duct 50 to form silencer 100. Additionally or alternatively, at least one baffle 110 is secured separately to duct 50 to at least partially form silencer 100.

Each baffle 110 extends from a first end 112 to a second end 114. In the exemplary embodiment, each baffle 110 is generally rectangular in cross section and extends linearly in longitudinal direction 60. In alternative embodiments, each baffle 110 has any suitable shape, such as, but not limited to, a curved shape. A length 116 of each baffle 110 is defined between first end 112 and second end 114. In the exemplary embodiment, length 116 of each baffle is substantially equal to silencer length 106. In alternative embodiments, length 116 of at least one baffle 110 differs from silencer length 106. Moreover, in the exemplary embodiment, baffles 110 are substantially longitudinally aligned within silencer 100. In alternative embodiments, baffles 110 are arranged in any suitable fashion that enables silencer 100 to function as described herein.

In the exemplary embodiment, each baffle 110 has a substantially equal width 118 in a transverse direction 62 defined transverse to the flow of air 11. In alternative embodiments, width 118 of at least one baffle 110 differs from width 118 of other baffles 110. In the exemplary embodiment, air 11 flowing from silencer first end 102 to silencer second end 104 flows substantially between baffles 110. In alternative embodiments, at least a portion of air 11 flowing from silencer first end 102 to silencer second end 104 flows through another suitable flow path. Moreover, in the exemplary embodiment, each pair of baffles 110 is separated, in transverse direction 62, by a substantially equal spacing distance 120. In alternative embodiments, spacing distance 120 for at least one pair of baffles 110 differs from spacing distance 120 for other pairs of baffles 110.

In some embodiments, spacing distance 120 is selected to tune baffles 110 to damp specific octave bands in a blade passing frequency of compressor blades 40, and/or other noise generated in intake section 12 and/or compressor section 14. In certain embodiments, spacing distance 120 is in a range of about 3 to about 12 inches. In a particular embodiment, spacing distance 120 is about 6 inches. In alternative embodiments, spacing distance 120 is one of less than about 3 inches and greater than about 12 inches.

Figure 4:
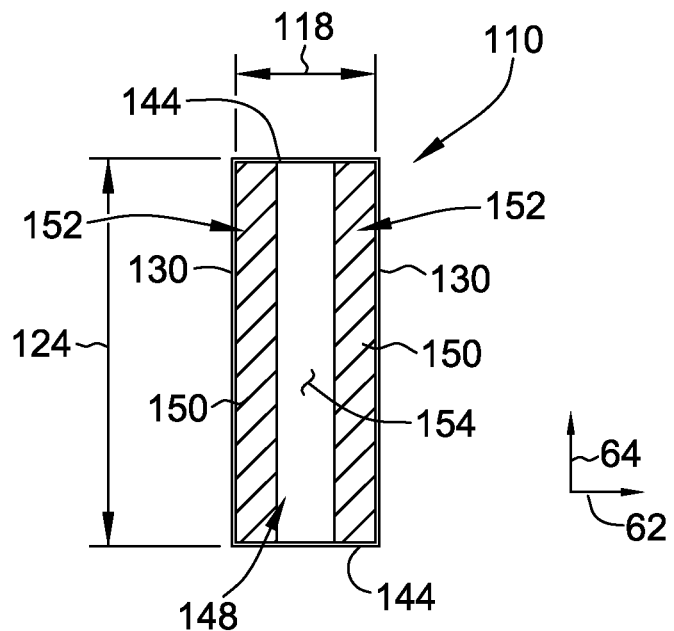
FIG. 4 is a schematic section view of a first exemplary embodiment of the exemplary baffle taken along lines 4-4 shown in FIG. 2.
Figure 5:
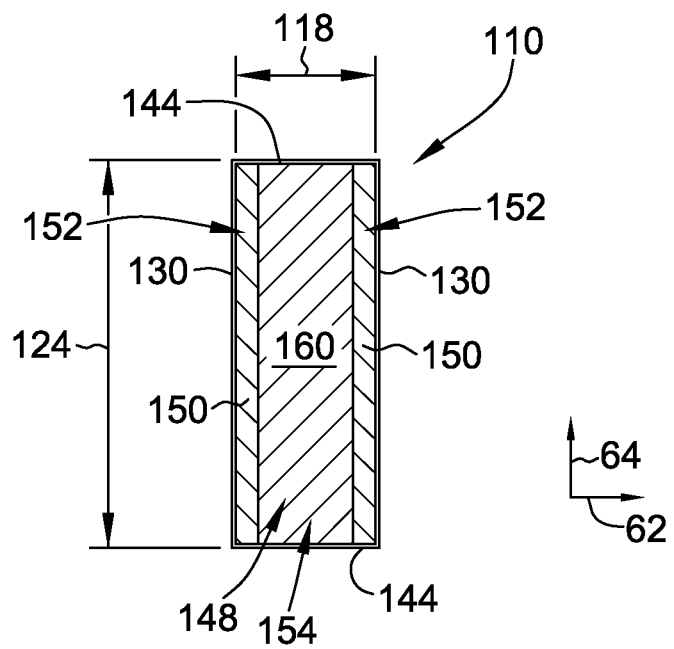
FIG. 5 is a schematic section view of a second exemplary embodiment of the exemplary baffle taken along lines 4-4 shown in FIG. 2.

FIG. 2 is a schematic side view of an exemplary baffle 110. FIG. 3 is a schematic top view of baffle 110. FIG. 4 is a schematic section view of a first exemplary embodiment of baffle 110 taken along lines 4-4 shown in FIG. 2. FIG. 5 is a schematic section view of a second exemplary embodiment of baffle 110 taken along lines 4-4 shown in FIG. 2.

With reference to FIGS. 2-5, baffle 110 includes a pair of oppositely disposed perforated walls 130 that at least partially define an exterior of baffle 110. In the exemplary embodiment, each perforated wall 130 is substantially flat, such as, but not limited to, formed from flat plates. Moreover, perforated walls 130 are generally parallel and spaced apart by width 118, and each perforated wall 130 extends in longitudinal direction 60 from proximate baffle first end 112 to baffle second end 114. Also in the exemplary embodiment, each perforated wall 130 has a length 124 in a third direction 64, defined perpendicular to longitudinal direction 60 and transverse direction 62, sized to extend between oppositely disposed boundary walls (not shown) of duct 50. In alternative embodiments, each perforated wall 130 has any suitable shape, is disposed in any suitable fashion, extends over any suitable extent between baffle first end 112 and baffle second end 114, and has any suitable length 124 in third direction 64 that enables silencer 100 to function as described herein.

Figure 6:
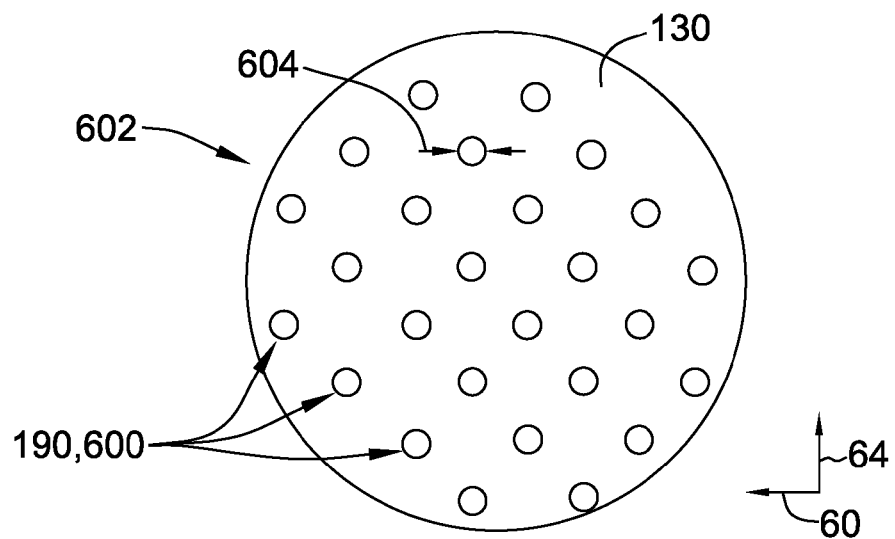
FIG. 6 is a schematic detail view of region 6 identified in FIG. 2 according to a first exemplary embodiment of a perforated wall shown in FIG. 2.
Figure 7:
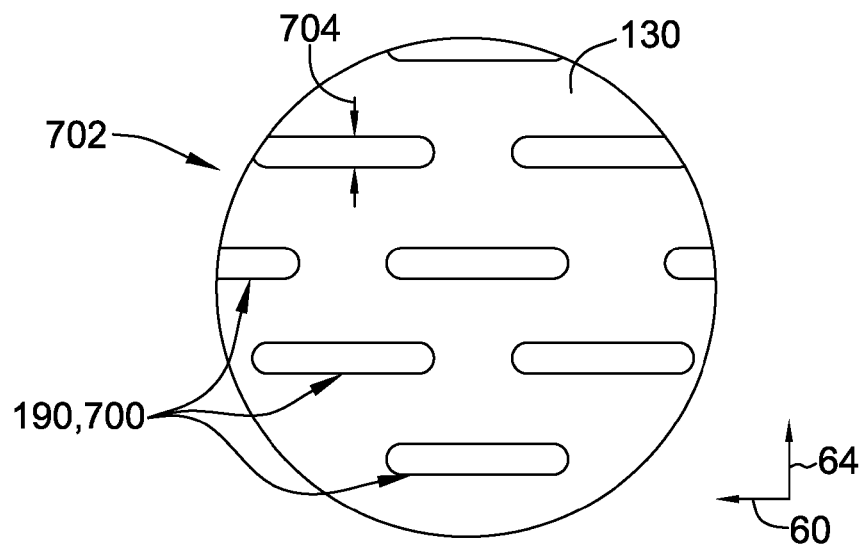
FIG. 7 is a schematic detail view of region 6 identified in FIG. 2 according to a second exemplary embodiment of the perforated wall shown in FIG. 2.
Figure 8:
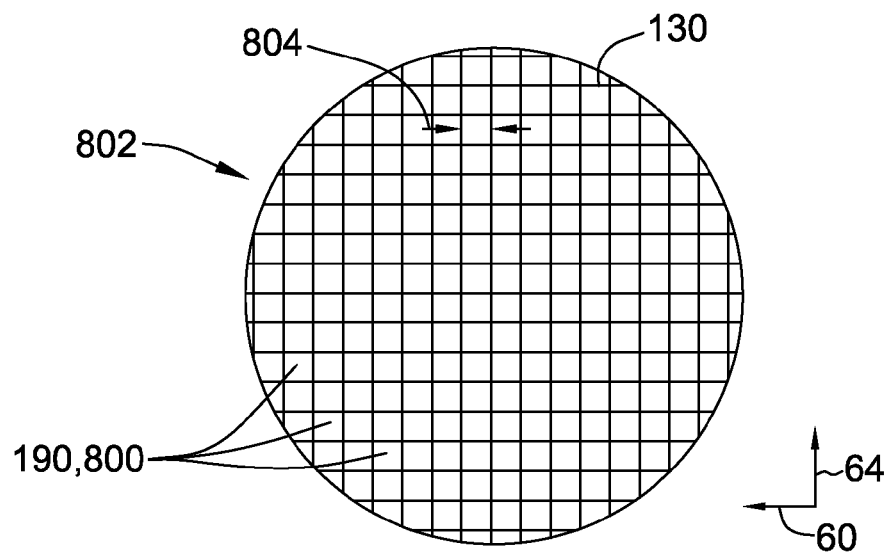
FIG. 8 is a schematic detail view of region 6 identified in FIG. 2 according to a third exemplary embodiment of the perforated wall shown in FIG. 2.
Figure 9:
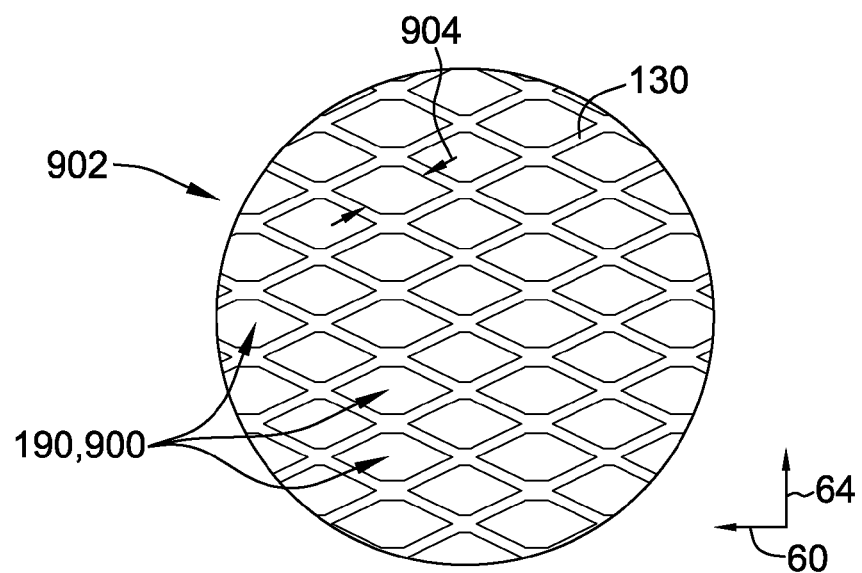
FIG. 9 is a schematic detail view of region 6 identified in FIG. 2 according to a fourth exemplary embodiment of the perforated wall shown in FIG. 2.

FIG. 6 is a schematic detail view of region 6 shown in FIG. 2 according to a first exemplary embodiment of perforated wall 130. FIG. 7 is a schematic detail view of region 6 shown in FIG. 2 according to a second exemplary embodiment of perforated wall 130. FIG. 8 is a schematic detail view of region 6 shown in FIG. 2 according to a third exemplary embodiment of perforated wall 130. FIG. 9 is a schematic detail view of region 6 shown in FIG. 2 according to a fourth exemplary embodiment of perforated wall 130. With reference to FIGS. 2 and 6-9, each perforated wall 130 includes a plurality of perforations 190 defined therein and extending therethrough in transverse direction 62. Perforations 190 are sized and spaced on perforated walls 130 such that at least a portion of the sound generated by the flow of air 11 in duct 50 reaches at least one sound absorbing material within baffle 110, as will be described herein.

In the first embodiment, shown in FIG. 6, perforations 190 include circular openings 600 defined in perforated walls 130 and extending therethrough. In the exemplary embodiment, circular openings 600 are arranged in a pattern 602 on each perforated wall 130. In alternative embodiments, circular openings 600 are arranged in any suitable fashion on perforated walls 130 that enables baffle 110 to function as described herein. In the exemplary embodiment, each circular opening 600 has a diameter 604 in a range of about 1 millimeter to about 6 millimeters. In alternative embodiments, at least one circular opening 600 has diameter 604 less than about 1 millimeter or greater than about 6 millimeters.

In the second embodiment, shown in FIG. 7, perforations 190 include elongated slots 700 defined in perforated walls 130 and extending therethrough. In the exemplary embodiment, slots 700 are elongated in longitudinal direction 60. In alternative embodiments, slots 700 are elongated in any suitable direction that enables baffle 110 to function as described herein. In the exemplary embodiment, slots 700 are arranged in a pattern 702 on each perforated wall 130. In alternative embodiments, slots 700 are arranged in any suitable fashion on perforated walls 130 that enables baffle 110 to function as described herein. In the exemplary embodiment, each slot 700 has a width 704 in a range of about 1 millimeter to about 6 millimeters. In alternative embodiments, at least one slot 700 has width 704 less than about 1 millimeter or greater than about 6 millimeters.

In the third embodiment, shown in FIG. 8, perforations 190 include mesh screen openings 800 defined in perforated walls 130 and extending therethrough. In the exemplary embodiment, mesh screen openings 800 are generally square and are complementarily defined by a wire mesh structure 802 that at least partially defines perforated walls 130. In alternative embodiments, mesh screen openings 800 have any suitable shape that enables baffle 110 to function as described herein. In the exemplary embodiment, each mesh screen opening 800 has a width 804 in a range of about 1 millimeter to about 6 millimeters. In alternative embodiments, at least one mesh screen opening 800 has width 804 less than about 1 millimeter or greater than about 6 millimeters.

In the fourth embodiment, shown in FIG. 9, perforations 190 include gaps 900 defined in perforated walls 130 and extending therethrough. In the exemplary embodiment, gaps 900 are generally diamond-shaped and are complementarily defined by an expanded metal structure 902 that at least partially defines perforated walls 130. In alternative embodiments, gaps 900 have any suitable shape that enables baffle 110 to function as described herein. In the exemplary embodiment, each gap 900 has a width 904 in a range of about 1 millimeter to about 6 millimeters. In alternative embodiments, at least one gap 900 has width 904 less than about 1 millimeter or greater than about 6 millimeters.

In alternative embodiments, perforations 190 are sized and spaced on perforated walls 130 in any suitable fashion that enables baffle 110 to function as described herein.

With reference again to FIGS. 2-5, baffle 110 defines a first surface 140 proximate baffle first end 112, such that first surface 140 extends between the pair of perforated walls 130. In the exemplary embodiment, first surface 140 has a rounded shaped to facilitate reducing resistance of baffle 110 to air flow 11. In alternative embodiments, first surface 140 has any suitable shape that enables silencer 100 to function as described herein, such as, but not limited to, a pointed surface or a flat surface (not shown). Baffle 110 also includes a second surface 142 at baffle second end 114, opposite first surface 140. In the exemplary embodiment, second surface 142 is substantially flat and extends between the pair of perforated walls 130. In alternative embodiments, second surface 142 has any suitable shape that enables silencer 100 to function as described herein, such as, but not limited to, a pointed surface or a curved surface (not shown).

Baffle 110 also includes a pair of oppositely disposed caps 144. In the exemplary embodiment, caps 144 are generally parallel and spaced apart by length 124 in third direction 64, and each cap 144 extends between the pair of perforated walls 130 across width 118. In alternative embodiments, caps 144 have any suitable shape and extent that enables silencer 100 to function as described herein.

In the exemplary embodiment, perforated walls 130, rounded surface 140, second surface 142, and caps 144 cooperate to define an interior cavity 148 within baffle 110. In alternative embodiments, baffle 110 includes any suitable additional or alternative structure that at least partially defines interior cavity 148 within baffle 110.

In the first exemplary embodiment shown in FIG. 4, a first sound absorbing material 150 is disposed within interior cavity 148. First sound absorbing material 150 is at least one material that is substantially completely vaporizable at an operating temperature of rotary machine 10. For example, but not by way of limitation, first sound absorbing material 150 includes at least one of a polyurethane foam, a melamine foam, and a polyethylene fiber that burns substantially completely at the operating temperature of rotary machine 10. Thus, to the extent that first sound absorbing material 150 escapes from interior cavity 148, such as through perforations 190, into the flow of air 11, first sound absorbing material 150 vaporizes in combustor section 16 (shown in FIG. 1) and remains vaporized at an operating temperature throughout turbine section 18 (shown in FIG. 1), rather than forming CMAS deposits on hot gas path components of rotary machine 10. In alternative embodiments, first sound absorbing material 150 is any suitable sound absorbing material that enables baffle 110 to function as described herein and is not capable of generating substantial CMAS deposits at the operating temperature of rotary machine 10.

In the exemplary embodiment, first sound absorbing material 150 includes a pair of panels 152 of first sound absorbing material 150 disposed within interior cavity 148, such that each panel 152 is coupled proximate a respective one of perforated walls 130. Moreover, a chamber 154 is defined within interior cavity 148 between the pair of panels 152. In the exemplary embodiment, each panel 152 extends in longitudinal direction 60 from proximate baffle first end 112 to baffle second end 114, and in third direction 64 from a first to a second of caps 144. In alternative embodiments, each panel 152 extends over any suitable extent between baffle first end 112 and baffle second end 114 and between caps 144 in third direction 64, that enables baffle 110 to function as described herein. In alternative embodiments, first sound absorbing material 150 is arranged with interior cavity 148 other than in panels 152 in any suitable fashion that enables baffle 110 to function as described herein.

In some embodiments, at least one of an acoustic cloth (not shown) and a metal mesh (not shown) is positioned at least partially between each panel 152 and the adjacent perforated wall 130. The acoustic cloth and/or metal mesh is configured to facilitate retaining first sound absorbing material 150 within interior cavity 148, and/or to facilitate maintaining a shape and/or position of panels 152 within interior cavity 148. In addition, the acoustic cloth and/or metal mesh is configured to be substantially permeable to acoustic waves in a range targeted for damping by baffle 110, such that the noise to be damped substantially reaches panels 152 and/or interior cavity 148. In alternative embodiments, any suitable material that facilitates retaining first sound absorbing material 150 and/or maintaining the shape and/or position of panels 152, and is substantially permeable to acoustic waves in a range targeted for damping by baffle 110, is at least partially positioned between each panel 152 and the adjacent perforated wall 130. In other alternative embodiments, baffle 110 does not include any material positioned between each panel 152 and the adjacent perforated wall 130.

In certain embodiments, a first portion of the sound generated by the flow of air 11 in duct 50 is absorbed by first sound absorbing material 150, and a second portion of the sound generated by the flow of air 11 in duct 50 passes through first sound absorbing material 150 into chamber 154, which serves as a damping chamber to further baffle the sound generated by the flow of air 11 in duct 50. For example, but not by way of limitation, first sound absorbing material 150 is a reticulated foam defining an open-celled structure that enables the second portion of sound to pass through with reduced acoustical choking. Thus, in certain embodiments, the exemplary embodiment of FIG. 4 enables baffle 110 to absorb sound from duct 50 with reduced acoustical choking and a reduced or eliminated risk of CMAS deposits in rotary machine 10.

In the second exemplary embodiment shown in FIG. 5, panels 152 of first sound absorbing material 150 again are coupled proximate respective perforated walls 130, defining chamber 154. However, a second sound absorbing material 160 is disposed within chamber 154. In contrast to first sound absorbing material 150, second sound absorbing material 160 is a material that is not substantially completely vaporizable at the operating temperature of rotary machine 10. Thus, second sound absorbing material 160 is capable of generating substantial CMAS deposits at the operating temperature of rotary machine 10. For example, but not by way of limitation, second sound absorbing material 160 includes at least one of a mineral wool and a fiberglass material that does not burn substantially completely at the operating temperature of rotary machine 10. In some embodiments, second sound absorbing material 160 is selected to have an increased sound-absorbing efficiency as compared to first sound absorbing material 150. Additionally or alternatively, second sound absorbing material 160 is selected to absorb sounds in a frequency range other than that absorbed by first sound absorbing material 150. In alternative embodiments, second sound absorbing material 160 is any suitable sound absorbing material that enables baffle 110 to function as described herein and is capable of generating CMAS deposits at the operating temperature of rotary machine 10.

In the exemplary embodiment, second sound absorbing material 160 extends in longitudinal direction 60 from proximate baffle first end 112 to baffle second end 114, in transverse direction 62 from a first to a second of panels 152, and in third direction 64 from a first to a second of caps 144. In alternative embodiments, second sound absorbing material 160 extends over any suitable extent between baffle first end 112 and baffle second end 114, between panels 152, and between caps 144, that enables silencer 100 to function as described herein.

In some embodiments, a first portion of the sound generated by the flow of air 11 in duct 50 is absorbed by first sound absorbing material 150, and a second portion of the sound generated by the flow of air 11 in duct 50 passes through first sound absorbing material 150 into second sound absorbing material 160, which further absorbs the sound generated by the flow of air 11 in duct 50. Moreover, because first sound absorbing material 150 is interposed between second sound absorbing material 160 and each perforated wall 130, a risk of second sound absorbing material 160 escaping from interior cavity 148 through perforations 190 to form CMAS deposits in rotary machine 10 is reduced or eliminated.

Additionally, in certain embodiments, first sound absorbing material 150 is selected to provide improved sound transmission from duct 50 to second sound absorbing material 160. For example, but not by way of limitation, first sound absorbing material 150 is a reticulated foam defining an open-celled structure that enables the second portion of sound to pass through with reduced acoustical choking. Thus, in certain embodiments, the exemplary embodiment of FIG. 5 enables use in baffle 110 of second sound absorbing material 160, having a relatively increased sound absorbing efficiency but also a potential to generate CMAS deposits, with a reduced or eliminated risk of CMAS deposits in rotary machine 10.

In some embodiments, at least one of an acoustic cloth, a metal mesh, and another suitable material (not shown) is positioned at least partially between each panel 152 and the adjacent perforated wall 130, as described above with respect to the embodiment shown in FIG. 4. In alternative embodiments, baffle 110 does not include any material positioned between each panel 152 and the adjacent perforated wall 130.

Figure 10:
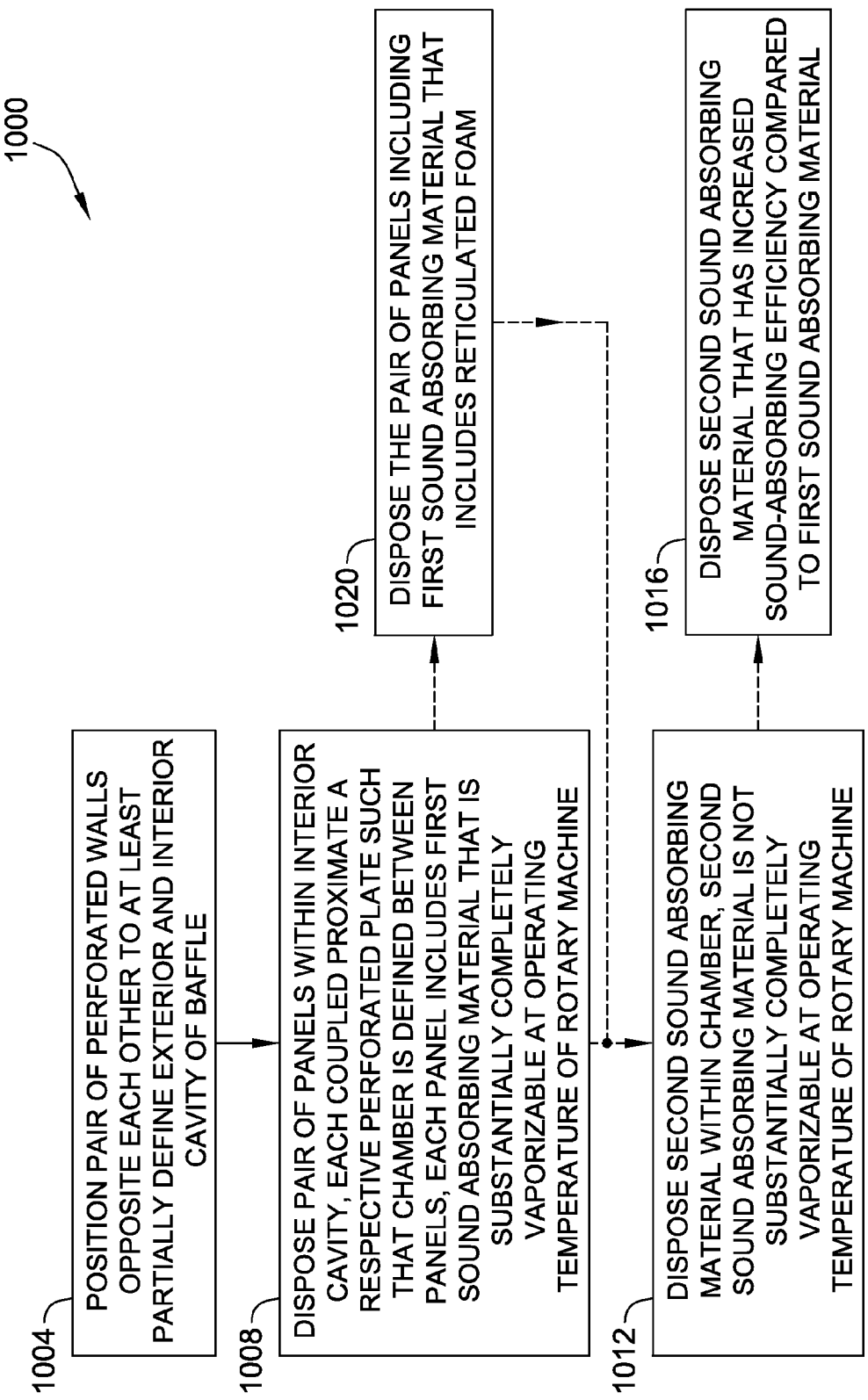
FIG. 10 is a flow diagram of an exemplary embodiment of a method of making a baffle, such as any of the exemplary baffles shown in FIGS. 2-7, for the exemplary rotary machine shown in FIG. 1.

An exemplary embodiment of a method 1000 of making a baffle, such as baffle 110, for an air intake section of a rotary machine, such as air intake section 12 of rotary machine 10, is illustrated in a flow diagram in FIG. 10. With reference also to FIGS. 1-9, exemplary method 1000 includes positioning 1004 a pair of perforated walls, such as perforated walls 130, opposite each other to at least partially define an exterior of the baffle and an interior cavity, such as interior cavity 148, of the baffle. Method 1000 also includes disposing 1008 a pair of panels, such as panels 152, within the interior cavity. Each of the panels is coupled proximate a respective one of the perforated walls, such that a chamber, such as chamber 154, is defined between the panels. Each of the panels includes a first sound absorbing material, such as first sound absorbing material 150, that substantially completely vaporizes at an operating temperature of the rotary machine.

In certain embodiments, method 1000 also includes disposing 1012 a second sound absorbing material, such as second sound absorbing material 160, within the chamber. The second sound absorbing material does not substantially completely vaporize at the operating temperature of the rotary machine.

In some embodiments, the step of disposing 1012 the second sound absorbing material within the chamber comprises disposing 1016 the second sound absorbing material that has an increased sound-absorbing efficiency as compared to said first sound absorbing material. In certain embodiments, the step of disposing 1008 the pair of panels within the interior cavity comprises disposing 1020 the pair of panels including the first sound absorbing material that includes a reticulated foam.

Exemplary embodiments of a baffle for an air intake section of a rotary machine, and a method of making such a baffle, are described above in detail. The embodiments described herein provide an advantage over known baffles by providing sound absorption using a first sound absorbing material that presents a reduced or eliminated risk of CMAS deposits in the rotary machine. The first sound absorbing material is positioned proximate each of at least two exterior perforated walls of the baffle, such that an interior chamber is defined therebetween. Some embodiments provide an advantage in that the interior chamber provides a further damping chamber. Alternatively, a second sound absorbing material, having improved acoustical damping capability but also increased risk of CMAS deposits, is positioned within the chamber. The embodiments present an advantage in that, because the first sound absorbing material is interposed between the second sound absorbing material and the exterior perforations, a risk of the second sound absorbing material escaping the baffle to form CMAS deposits in the rotary machine is reduced or eliminated. Moreover, certain embodiments present an advantage in that the first sound absorbing material is reticulated, reducing an acoustical choking of the interior chamber.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A baffle for an air intake section of a rotary machine, said baffle comprising:
    a pair of oppositely disposed perforated walls that at least partially define an exterior of said baffle and an interior cavity of said baffle; and
    a pair of panels disposed within said interior cavity, each of said panels coupled proximate a respective one of said perforated walls such that a chamber is defined between said panels, each of said panels comprising a first sound absorbing material that is substantially completely vaporizable at an operating temperature of the rotary machine.

2. The baffle of claim 1, further comprising a second sound absorbing material disposed within said chamber, said second sound absorbing material is not substantially completely vaporizable at the operating temperature of the rotary machine.

3. The baffle of claim 2, wherein said second sound absorbing material has an increased sound-absorbing efficiency as compared to said first sound absorbing material.

4. The baffle of claim 2, wherein said second sound absorbing material comprises at least one of a mineral wool and a fiberglass material.

5. The baffle of claim 1, wherein said first sound absorbing material comprises at least one of a polyurethane foam, a melamine foam, and a polyethylene fiber.

6. The baffle of claim 1, wherein said first sound absorbing material comprises a reticulated foam.

7. The baffle of claim 1, wherein each of said perforated walls comprises a plurality of perforations defined therein and extending therethrough.

8. The baffle of claim 7, wherein each of said perforations is at least one of a circular opening, an elongated slot, a mesh screen opening, and a gap defined in an expanded metal structure.

9. A rotary machine comprising:
    an air intake section comprising a duct;
    a combustor section coupled in flow communication with, and downstream from, said air intake section; and
    a silencer comprising a plurality of baffles coupled together in a spaced arrangement within said duct, at least one of said baffles comprising:
    a pair of oppositely disposed perforated walls that at least partially define an exterior of said baffle and an interior cavity of said baffle; and a pair of panels disposed within said interior cavity, each of said panels coupled proximate a respective one of said perforated walls such that a chamber is defined between said panels, each of said panels comprising a first sound absorbing material that is substantially completely vaporizable at an operating temperature of said combustor section.

10. The rotary machine of claim 9, further comprising a second sound absorbing material disposed within said chamber, said second sound absorbing material is not substantially completely vaporizable at the operating temperature of said combustor section.

11. The rotary machine of claim 10, wherein said second sound absorbing material has an increased sound-absorbing efficiency as compared to said first sound absorbing material.

12. The rotary machine of claim 10, wherein said second sound absorbing material comprises at least one of a mineral wool and a fiberglass material.

13. The rotary machine of claim 9, wherein said first sound absorbing material comprises at least one of a polyurethane foam, a melamine foam, and a polyethylene fiber.

14. The rotary machine of claim 9, wherein said first sound absorbing material comprises a reticulated foam.

15. The rotary machine of claim 9, wherein each of said perforated walls comprises a plurality of perforations defined therein and extending therethrough.

16. The rotary machine of claim 15, wherein each of said perforations is at least one of a circular opening, an elongated slot, a mesh screen opening, and a gap defined in an expanded metal structure.

17. A method of making a baffle for an air intake section of a rotary machine, said method comprising:

positioning a pair of perforated walls opposite each other to at least partially define an exterior of the baffle and an interior cavity of the baffle; and disposing a pair of panels within the interior cavity, each of the panels coupled proximate a respective one of the perforated walls such that a chamber is defined between the panels, each of the panels including a first sound absorbing material that is substantially completely vaporizable at an operating temperature of the rotary machine.

18. The method of claim 17, further comprising disposing a second sound absorbing material within the chamber, wherein the second sound absorbing material is not substantially completely vaporizable at the operating temperature of the rotary machine.

19. The baffle of claim 18, wherein said disposing the second sound absorbing material within the chamber comprises disposing the second sound absorbing material that has an increased sound-absorbing efficiency as compared to said first sound absorbing material.

20. The method of claim 17, wherein said disposing the pair of panels within the interior cavity comprises disposing the pair of panels including the first sound absorbing material that includes a reticulated foam.

* * * * *